April 7, 1953 L. G. SCHIMPF 2,634,366

LIGHT REPEATER FOR PULSE COMMUNICATION SYSTEMS

Filed Nov. 28, 1947 2 SHEETS—SHEET 1

INVENTOR
L. G. SCHIMPF

BY Stanley B. Kent
ATTORNEY

April 7, 1953 L. G. SCHIMPF 2,634,366

LIGHT REPEATER FOR PULSE COMMUNICATION SYSTEMS

Filed Nov. 28, 1947 2 SHEETS—SHEET 2

INVENTOR
L. G. SCHIMPF

BY Stanley B. Kent
ATTORNEY

Patented Apr. 7, 1953

2,634,366

UNITED STATES PATENT OFFICE 2,634,366

LIGHT REPEATER FOR PULSE COMMUNICATION SYSTEMS

Luther G. Schimpf, New Providence, N. J., assignor to Bell Telephone Laboratories, Incorporated, New York, N. Y., a corporation of New York Application November 28, 1947, Serial No. 788,413

15 Claims. (Cl. 250—7)

This invention relates to electrooptical systems and more particularly to a transducer for converting electrical energy into radiant energy of the nature of light.

An object of the invention is to provide an improved method and means for converting electrical energy into radiant energy of the nature of light.

A further object is to provide an improved repeater of light pulses.

In an illustrative embodiment of the invention, received light pulses of low energy content are converted into light pulses of high energy content through the intermediary of electrical energy. Incoming and outgoing light pulses are transmitted through light conductors such as internally reflecting hollow tubes or solid transparent rods. The incoming light signals are in the form of a series of separated groups of short pulses. These incoming light pulses are directed to the light sensitive cathode of a photoelectric electron multiplier. The alternating current components of the resulting electrical pulses are rectified and the resulting signal pulses are impressed upon the input circuit of a single trip multivibrator to control the high frequency output energy of a pentode vacuum tube amplifier on the input circuit of which is impressed high frequency energy from a high frequency oscillator. The output voltage of the multivibrator normally biases the suppressor grid of the pentode tube to cut-off. The signal pulses from the rectifier are impressed on the multivibrator through a differentiating circuit comprising a condenser and a resistor, the differentiated signal functioning to block the output tube of the multivibrator which in turn removes the blocking bias from the suppressor grid of the pentode tube and effects transmission of high frequency energy. The output circuit of the pentode amplifier is connected through a band-pass filter including a transformer to the electric field producing electrodes of a Kerr cell light valve to control the transmission of polarized light. The Kerr cell will transmit light regardless of the polarity of the applied voltage. Hence, a light pulse will be passed for each half cycle of the high frequency voltage. Each signal pulse will consist of a train of light pulses having twice the frequency of the high frequency voltage.

The outgoing light pulses are similar to the incoming light pulses referred to above except possibly as to duration of the signal pulses and the frequency of the high frequency pulses. The duration of the signal pulses is dependent upon the time constant of the multivibrator. The frequency of the high frequency pulses is dependent upon the frequency of the high frequency oscillator. These need not be identical in the various repeaters of a signal transmission system. The energy content of the outgoing pulses is many times greater than that of the incoming pulses.

Such a repeater as is described above comprises a photoelectric electron multiplier adapted to be illuminated by light signal impulses, a rectifier coupled to the multiplier through a condenser, a differentiating circuit for energizing a single trip multivibrator in accordance with the differential of the signal pulses from the rectifier, a pentode amplifier normally blocked by the single trip multivibrator to control the application of high frequency from a high frequency oscillator to the electrodes of a Kerr cell light valve. An advantage of such a repeater is its relative simplicity coupled with a high ratio of signal to noise.

In a modified illustrative embodiment of the invention, a supersonic light valve is employed instead of the Kerr cell light valve. In this embodiment, the output circuit of the pentode tube amplifier is connected to the driving crystal of the supersonic light valve.

In a third illustrative embodiment of the invention, a cathode ray tube having a fluorescent screen is used as a source of the light pulses. The position of a cathode ray beam is controlled by the transmitted high frequency energy through a three electrode vacuum tube. Normally the cathode ray beam impinges on the fluorescent screen at a position such that the resulting light cannot be projected into the outgoing light conductor, the three electrode vacuum tube being biased to cut-off. When signals are incoming and the pentode amplifier is transmitting high frequency energy, the three electrode vacuum tube is unblocked and the cathode beam is moved to a position to transmit light into the light conductor. In a modification of this third illustrative embodiment, the three electrode tube is directly controlled by the output voltage of the multivibrator. In this modification, the transmitted light pulses correspond respectively to the signal pulses and are not made up of a series of high frequency light pulses.

The invention will now be described in more detail having reference to the accompanying drawing.

Identical elements in the several figures of the drawing are identified by the same reference characters respectively.

Figure 1:
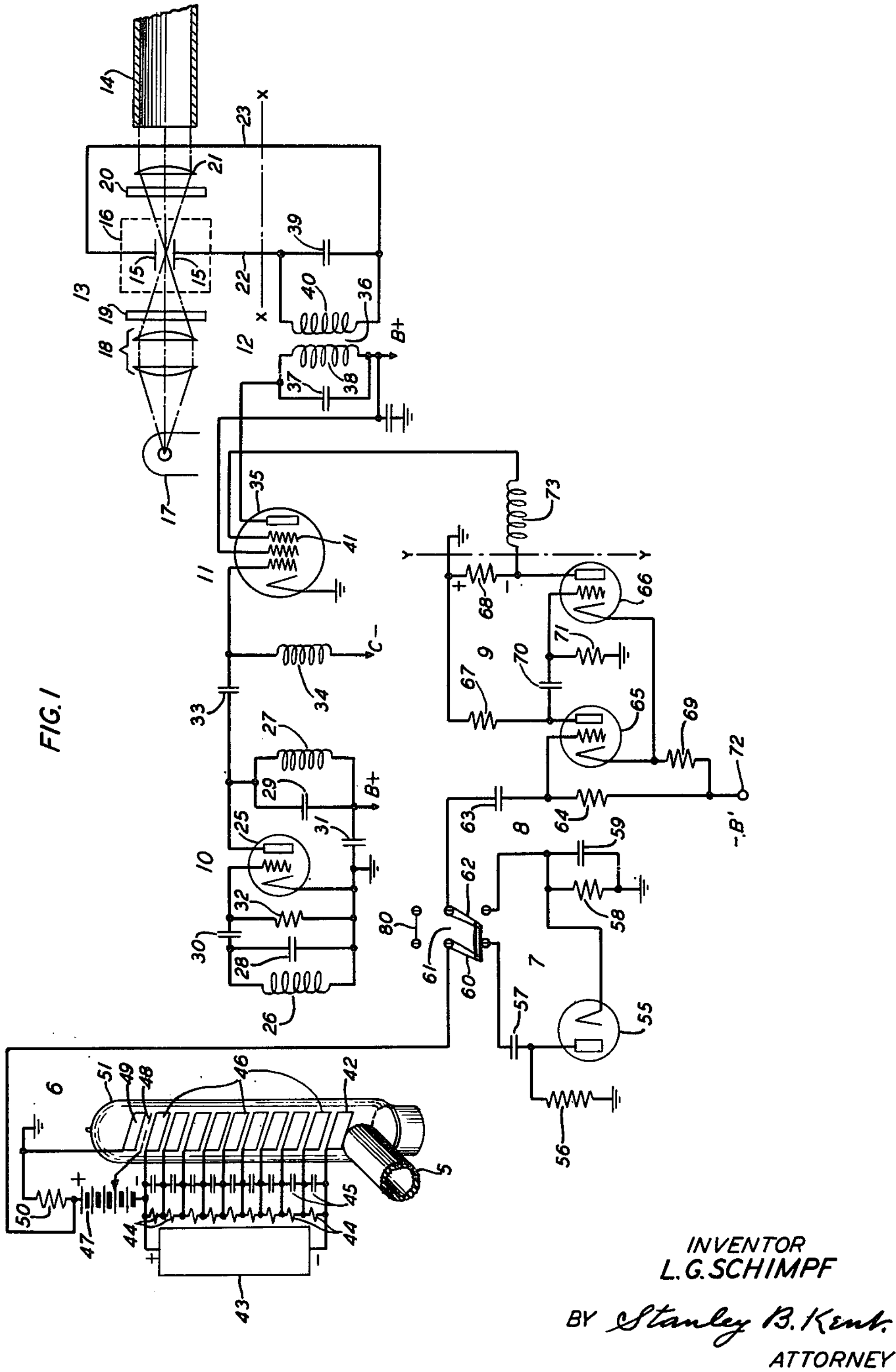
Fig. 1 shows one embodiment of the invention including a Kerr cell light valve.

Referring now to Fig. 1 a light repeater embodying this invention is illustrated comprising an incoming light conductor 5, a photoelectric electron multiplier 6, a diode rectifier 7, a differentiating circuit 8, a single trip multivibrator 9, a high frequency oscillator 10, a high frequency pentode amplifier 11, a band-pass filter 12, a Kerr cell light valve 13 and an outgoing light conductor 14. These several elements are so designed and combined as to produce a relatively simple system having high gain with a relatively low signal-to-noise ratio.

The Kerr cell light valve 13 comprises a pair of plate electrodes 15, 15 which are immersed in nitrobenzol within a container 16. Light from a source 17 is directed by lenses 18 through a sheet of light polarizing material 19 between the plates 15 to another sheet of light polarizing material 20. Light which passes through sheet 20 is directed by lens 21 into the outgoing light conductor 14. If plane polarized light is directed through a suitable dielectric, such as nitrobenzol, the plane of polarization can be rotated by subjecting the dielectric to an electrostatic field. Such electrostatic field is produced by applying a voltage to plates 15, 15 by way of conductors 22 and 23. The condenser lens 18 is used to concentrate the light from the light source 17 between the plates 15, 15 of the light valve 13. The light entering the cell is plane polarized by the sheet of polarizing material 19 placed between the light source 17 and the Kerr cell. The sheet of polarizing material 19 is placed so that the plane of polarization of the entering light is at an angle of 45 degrees with respect to the electric field through the cell. This angle gives the maximum Kerr effect. When the electric field is zero through the cell, the plane of polarization is not changed when the light passes through the liquid. The second sheet of polarizing material 20 is placed so that its angle of polarization is at 90 degrees with respect to the angle of polarization of the sheet of polarizing material 19. No light is transmitted through the cell in the absence of a polarizing voltage on the plates 15, 15. If an electric field is now applied to the cell, the plane of polarization of the incident light is rotated, the rotation increasing as the square of the applied field. Due to this rotation, more and more light will be passed by the second polarizing sheet as the electric field is increased. The amount of light passed by the light valve 13 may be determined in accordance with the following equation:

$$I=I_0 \sin^2 (\pi J l E^2) \quad (1)$$

where $I_0$=the incident light
$I$=the light output
$J$=the Kerr constant ($3.46 \cdot 10^{-5}$ for nitrobenzol at 20° C. and wavelength of .546 micron)
$l$=length of light path through the electric field
$E$=field intensity in electrostatic units From Equation 1 it can be seen that the effect is far from being linear with respect to the applied field but since the light valve 13 is used only as a light shutter this is of no consequence. Equation 1 also shows that the light transmitted is an oscillating function with respect to the applied voltage. For normal operation the voltage applied is the value required to reach the first maximum. When using nitrobenzol in the Kerr cell, there is no appreciable time lag between the applied field and the transmitted light.

A suitable Kerr cell for use in the practice of this invention comprises plates 15, 15 having a length along the optical axis of two centimeters and a width of one centimeter and a spacing between plates of 0.2 centimeter. Such a cell using nitrobenzol shows maximum transmission of monochromatic light of a wavelength of 0.546 micron with an applied voltage between the plates of 5000 volts. This cell has a capacitance of 33 micromicrofarads. The dielectric constant of nitrobenzol is about 37. The voltage required to reach the first maximum can be reduced by closer spacing between the plates and by making the plates longer. However, these changes will increase the capacitance and reduce the available aperture. Increasing the capacitance will require a lower impedance driving source in order to open and close the shutter in a short time so the power required to operate the cell will not decrease with the decreased voltage required for operation. Furthermore, the smaller aperture will cut down the amount of light that can be passed through the cell. The voltage required to reach the first maximum may be reduced by using light of shorter wavelength since the Kerr constant increases as the wavelength of the light is decreased. The light transmission of nitrobenzol for various wavelengths is substantially constant for wavelengths of .470 micron and longer, therefore it is desirable to use electron multipliers having cathodes which are highly sensitive to light of short wavelength that is to blue green light.

In the repeater of Fig. 1, the Kerr cell light valve 13 is energized by high frequency electrical pulses. The light output pulses will consist of short trains of pulses at a rate twice the frequency of the high frequency driving source. This type of pulse is just as easy to detect with a photoelectric electron multiplier as a short direct current pulse and results in a larger signal-to-noise ratio if the output of the detector is connected to a band-pass filter. Using high frequency to drive the Kerr cell, makes the modulating circuit more simple since it is not required to charge a condenser to a high direct current voltage for each output pulse and then discharge this condenser into a resistance after each pulse is transmitted. The condenser referred to is the capacitance formed by the plate 15, 15 of the Kerr cell.

The source of high frequency electric pulses is the vacuum tube oscillator 10 which comprises a vacuum tube triode 25, coupled coils 26 and 27, associated condensers 28, 29, 30 and 31, a source of potential B+ and a grid leak resistor 32 forming a tuned plate tuned grid oscillator. This oscillator may operate at a frequency of 30 to 40 megacycles continuously. The oscillator 10 controls the high frequency amplifier 11 through coupling condenser 33, high frequency choke coil 34 and a suitable negative biasing voltage C−.

The high frequency amplifier 11 comprises a pentode vacuum tube 35, coupled to conductors 22 and 23 through a bandpass filter 12. The filter 12 comprises a step-up transformer 36 having a ratio of 4 or 5 and an input shunting condenser 37 connected across the input winding 38 and an output shunting condenser 39 connected across the output winding 40. The filter 12 is adapted to pass a band width of 4 to 6 megacycles. By applying a suitable signal voltage to the suppressor grid 41 of pentode tube 35, the amplifier 11 can be modulated to turn its high frequency output off and on under the control of the signal voltage. Therefore, application of high frequency voltage to the plates 15, 15 of Kerr cell 13 can be controlled. The signal voltage is of the proper polarity to turn on the high frequency output of amplifier 11 when signal pulses are received. The Kerr cell light valve 13 when stressed transmits light regardless of the polarity of the applied high frequency voltage. Hence, a light pulse will be produced for each half cycle of the high frequency voltage. Each signal pulse will consist of a train of light pulses twice the frequency of the high frequency voltage.

Assuming that the light conductor 5 receives light from a light repeater of the kind illustrated in Fig. 1, the light signals impressed on the photoelectric cathode 42 of electron multiplier 6 will consist of trains of light pulses of twice the frequency of the oscillator at such preceding repeater. A rectifier 43 energized from a 60 cycle power source supplies current to series connected resistive elements 44 across which condensers 45 of small capacity are connected. The negative terminal of the rectifier 43 is connected to the photoelectric cathode 42 of the electron multiplier 6. The secondary electron emitting cathodes 46 of the electron multiplier are supplied with voltage from the rectifier 43. This arrangement gives good regulation because the electron current is delivered over relatively short periods of time compared with the total transmission time and the condensers 45 do not have time to discharge appreciably. Battery 47 supplies voltage to the screen grid 48 and to the anode 49 of the electron multiplier 6. The output circuit of the electron multiplier includes a resistor 50 across which the output voltage appears. This output voltage will include pulses of a frequency twice that of the oscillator of the preceding repeater. It may be desirable to substitute for the resistor 50 a band-pass filter in order to minimize the noise of the multiplier tube 51.

The voltage pulses across resistor 50 are rectified in rectifier 7 which comprises diode tube 55, input resistor 56, input condenser 57, output resistor 58 and output condenser 59. Resistor 50 is connected to input condenser 57 through the left-hand blade 60 of double-pole double-throw switch 61, in its lower closed position. The purpose of this switch 61 will be obvious from the description to follow. Each train of high frequency pulses which make up each signal pulse, is rectified in rectifier 7 and the resulting signal pulse appears as a voltage pulse across resistor 58 and condenser 59.

These signal voltage pulses are impressed on the differentiating circuit or differentiator 8 through the right-hand blade 62 of switch 61 in its lower closed position. The differentiator 8 comprises a series condenser 63 and a shunt resistor 64. The function of differentiator 8 is to produce a peaked tripping pulse at the start of each signal pulse to trip the one trip multivibrator 9 for each signal pulse.

The single trip multivibrator 9 comprises two triode vacuum tubes 65 and 66, anode resistors 67 and 68, biasing resistor 69, coupling condenser 70, resistor 71 and a source of direct current —B' having its negative terminal connected to terminal 72. Triode 66 is normally conducting while triode 65 is normally blocked by the voltage drop across resistor 69. If a positive voltage is applied to the grid of triode 65, even for only a short interval, triode 65 will conduct and triode 66 will be cut off by reason of the fact that a large voltage drop occurs across resistor 67 which operates to place a negative potential on the grid with respect to the cathode of triode 66. Triode 65 will continue to conduct and triode 66 will remain cut off even after the triggering pulse has been removed due to the charge on condenser 70. The multivibrator will remain in this condition for a time interval determined by the values of the capacitance of condenser 70 and the resistance of resistor 71. When condenser 70 has partially discharged, triode 66 will begin to conduct and triode 65 will be cut off. The multivibrator will remain in this condition until another differentiated signal pulse is received which causes triode 65 to become conducting to start another cycle of operation.

The anode resistor 68 is connected through high frequency choke coil 73 to the suppressor grid 41 of pentode tube 35. When triode 66 is conducting, a large voltage drop appears across resistor 68 which biases the suppressor grid 41 of pentode 35 beyond cut-off so that no high frequency voltage is applied to the plates 15, 15 of Kerr cell light valve 13. When a train of incoming light pulses corresponding to a signal pulse arrives, a short positive signal voltage pulse is developed across resistor 58 and condenser 59. This pulse is differentiated by the differentiator condenser 63 and resistor 64 to impress a short trigger pulse on the grid of triode 65. Triode 65 begins to conduct and triode 66 is cut-off. When triode 66 is cut-off, no current flows through resistor 68 which removes the negative bias from the suppressor grid 41 of pentode 35. The high frequency amplifier 11 now amplifies the output energy of the oscillator 10 and applies high frequency voltage to the Kerr cell light valve 13. This voltage causes the transmission of short light pulses at twice the high frequency rate and a new train of light pulses is transmitted of higher amplitude than the incoming train of pulses.

Figure 2:
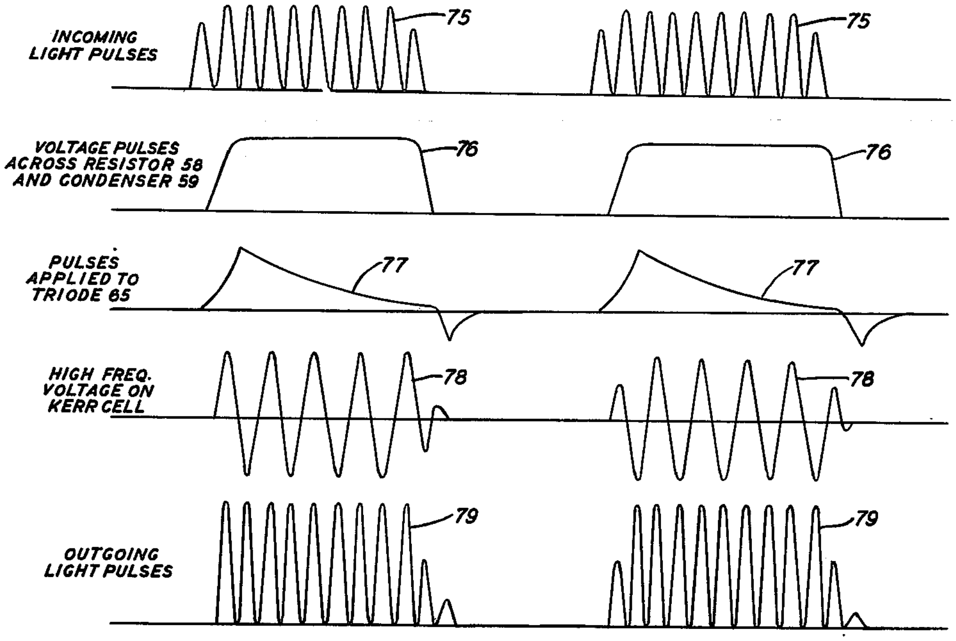
Fig. 2 illustrates graphically the optical and electrical conditions at various points of the embodiment of Fig. 1.

A graphical indication of the light and electrical pulses at various points in the system of Fig. 1 is given in Fig. 2. The incoming signal pulses consist of trains of light pulses 75. The output energy of the electron multiplier includes similar trains of electrical pulses which are rectified in rectifier 7, producing voltage pulses across resistor 58 of the form of the pulses 76 in Fig. 2. These pulses are differentiated in differentiator 8 to produce voltage pulses across resistor 64 of the form of the pulses 77 in Fig. 2. The initial portions of pulses 77 trigger off the single trip multivibrator 9 to produce trains of electrical voltage pulses which are impressed on the plates 15, 15 of the Kerr cell light valve 13 of the form of pulses 78 in Fig. 2. Since a pulse of light is transmitted to the outgoing light conductor 14 for each half wave of the pulses 78, the outgoing light pulses are of the form of the pulses 79 in Fig. 2.

In the event that the incoming light signal pulses in light conductor 5 are of the form of the pulses 76 in Fig. 2 that is, do not consist of trains of high frequency light pulses, the rectifier 7 is removed from the circuit by closing the switch 61 to its upper position. Corresponding electrical pulses in the output resistor 50 of the electron multiplier 6 are impressed on the differentiator 8 by way of blade 60, connector 80 and blade 62 of switch 61. The pulses appearing across resistor 64 of the differentiator 8, trigger off single trip multivibrator 9 in the manner described hereinbefore to produce trains of outgoing light pulses in the light conductor 14.

Figure 3:
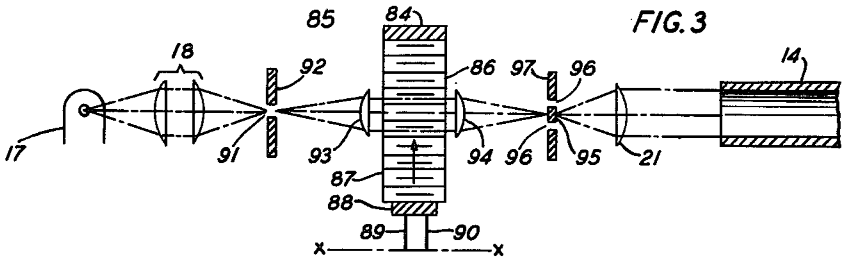
Fig. 3 shows a supersonic light valve which may be substituted for the Kerr cell light valve of the embodiment of Fig. 1.

This invention contemplates the use of a supersonic light valve in place of the Kerr cell light valve 13. A form of supersonic light valve 85 is illustrated in Fig. 3. This light valve 85 comprises a vessel or tank 86 filled with water or other suitable transparent elastic substance 87. The piezoelectric driver element 88 is provided at one end of the tank for setting up compressional waves in the liquid. The driver 88 comprises an X-cut quartz crystal cemented with sealing wax or other suitable material to the inner surface of the tank 86 and provided with electrodes to which terminal conductors 89 and 90 are connected. In order to attenuate the compressional waves at the end of their travel through the liquid 87 and therefore to prevent reflection of the waves which would interfere with the desired wave propagated through the liquid, absorbing material 84, such as layers of fine mesh wire screen or a felt pad, is provided at the end of the tank 86 opposite to the driving element 88. Light from a light source 17 is focused on a slit 91 in an opaque screen 92 by a lens 18. The light from slit 91 is made parallel by a lens 93 and directed through the liquid 87 in a direction at right angles to the propagated waves in the liquid. If the liquid 87 is not disturbed, an image of slit 91 is formed from the light passing through the liquid by lens 94 on an opaque bar 95 located centrally between two slits 96, 96 in a second opaque screen 97 and no light is transmitted toward the outgoing light conductor 14. If a high frequency voltage is applied to the driver element 88, its mechanical vibration will set up compressional waves in the liquid 87. This disturbance will travel at the speed of sound in the liquid toward the other end of the container 86 and will be absorbed by the absorbing material 84. As the light passes through the supersonic waves in the liquid 87, the light passing through a high pressure area will be retarded more than the light passing through an area of lower pressure. Some of the light which in the quiescent state was focused on the bar 95 will be defracted and fall on the slits 96, 96. This light will pass through the slits to the lens 21 and be directed thereby to the light conductor 14.

In order to use the supersonic light valve 85 of Fig. 3 in the repeater of Fig. 1, it is merely necessary to substitute the elements above the line X—X in Fig. 3 for the elements above the line X—X in Fig. 1. After this substitution has been made the conductors 89 and 90 of Fig. 3 are connected to the top and bottom terminals respectively of the secondary winding 40 of transformer 36 in Fig. 1.

In the proposed system just described a band-width of about 3 megacycles is required. The band-width of a quartz crystal working against a liquid on one side and air on the other side is about 10 per cent of its natural frequency. Therefore, a high frequency of at least 30 megacycles is required. The velocity of sound through water or other liquids which might be used in a supersonic light valve is about 1500 meters per second or 1.5 millimeters per microsecond. Light will be transmitted so long as the waves are passing the cell aperture. In Fig. 3 the horizontal lines within the container 86 represent the compressional waves and the arrow indicates their direction of transmission. In order to transmit a pulse a microsecond long, the aperture must be of the order of ¾ millimeter. Such a small aperture reduces the amount of light through the cell to a small value but due to the small amount of power required to energize the cell, such a system is relatively economical.

At a frequency of 30 megacycles and a velocity of propagation of 1500 meters per second, there will be 20 waves per millimeter in the liquid. With a narrow aperture this will result in a relatively small number of lines on the grating which are effective in scattering the incident light. Increasing the frequency will increase the number of waves per millimeter and the number of effective lines in the aperture. If desired, a frequency greater than 30 megacycles may be used to advantage.

The signal pulses from the supersonic light valve 85 are continuous pulses, that is, they are not trains of high frequency pulses. If such a repeater is used to transmit to another repeater of the same kind, or to a repeater like that of Fig. 1, the switch 61 will be closed to its upper position so that the resulting electrical signal pulses from the electron multiplier 6 will be impressed directly upon the differentiating circuit 8 to trip the single trip multivibrator 9.

Figure 4:
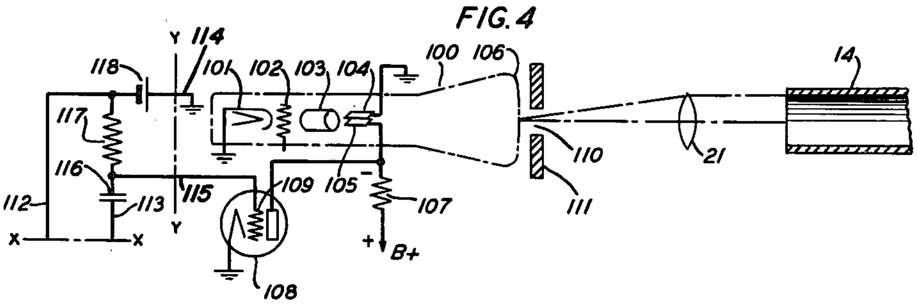
Fig. 4 shows a cathode ray tube and associated elements which may be substituted for portions of the embodiment of Fig. 1.

In another embodiment of the invention, a cathode ray tube is used as the control source of outgoing light as illustrated in Fig. 4. The cathode ray tube 100 is used comprising a cathode 101, a control electrode 102, a focusing electrode 103, a pair of deflecting plates 104 and 105 and a fluorescent screen 106. The cathode 101, control electrode 102 and focusing electrode 103 are energized in any conventional manner to produce on the fluorescent screen 106 an illuminated spot in the absence of a deflecting voltage on the deflecting plates 104 and 105. Deflecting plate 104 is connected to ground and deflecting plate 105 is connected through resistor 107 to the positive terminal of a source of plate potential B+ for a triode vacuum tube 108. The conditions are such that if the triode 108 is blocked by a negative potential on its grid 109, the illuminated spot on the cathode ray tube screen 106 appears to one side of an aperture 110 in an opaque screen 111 so that no light will be transmitted through lens 21 to the outgoing light conductor 14. If the triode 108 is unblocked, by overcoming or removing the negative bias on the grid 109, the positive potential on deflector plate 105 is reduced sufficiently to move the illuminated spot to a position in front of the aperture 110 so that light from the illuminated spot is directed by lens 21 to the inside of light conductor 14.

The light producing system of Fig. 4 may be combined with portions of the system of Fig. 1 in either one of two ways to effect the transmission of light into light conductor 14 by means of controlled triode 108. In one instance the elements of Fig. 4 above and to the right of the line X—X are substituted for the elements of Fig. 1 above the line X—X. In this modification the conductors 112 and 113 of Fig. 4 are connected respectively to the upper and lower terminals of the output winding 40 of transformer 36 of Fig.

1. In the second instance, the elements to the right of the line Y—Y in Fig. 4 are substituted for the elements to the right of and above the line Y—Y in Fig. 1. In this embodiment the conductors 114 and 115 are connected respectively to the upper and lower terminals of resistor 68 of the single trip multivibrator 9 of Fig. 1.

Referring now to the embodiment in which conductors 112 and 113 are connected to the output winding 40 of transformer 36, the triode 108 is controlled by high frequency alternating current impressed on the grid 109 through condenser 116 and coupling resistor 117. The triode 108 is biased to cut-off by battery 118. When signal pulses are incoming over light conductor 5, the high frequency alternating current is transmitted by high frequency amplifier 11, as described hereinbefore, so that triode 108 is unblocked during each positive half wave of the transmitted high frequency to effect transmission of pulses of light into the outgoing light conductor 14. The frequency of the transmitted light pulses is the same as the frequency of the high frequency alternating current from oscillator 10.

In the modification in which the conductors 114 and 115 are connected to the terminals of resistor 68, the triode 108 is controlled by the output voltage of the single trip multivibrator 9. As explained hereinbefore, triode 66 of multivibrator 9 is normally conducting when no signal light pulses are incoming to light conductor 5 and a relatively high direct current voltage is developed across resistor 68. The lower terminal of resistor 68 is negative with respect to the upper terminal. Since the lower terminal of resistor 68 is connected to the grid 109 of triode 108 through conductor 115 and the upper terminal is connected to the cathode of triode 108 through ground and conductor 114, a negative blocking voltage is normally applied to triode 108. When a light signal is received, triode 66 of multivibrator 9 is blocked so that no voltage appears across resistor 68 and triode 108 is unblocked to cause signal light pulse to be transmitted to outgoing light conductor 14.

Each of the specific illustrative embodiments of the invention described hereinbefore comprises means for converting electrical pulses into light pulses. The term light as used herein, includes not only electromagnetic radiation of a wavelength within the wavelengths of the visible spectrum but also of wavelengths both above and below the visible spectrum such as infrared and ultra-violet radiation.

Embodiments of the invention other than those specifically described hereinbefore as illustrative embodiments will occur to persons skilled in this art. Such embodiments come within the purview of the appended claims.

What is claimed is:

1. A signaling system comprising a source of electrical signaling pulses, means to differentiate said pulses producing peaked pulses therefrom, a single trip multivibrator connected to said differentiating means for tripping by said differentiated pulses, a source of high frequency waves controlled by said multivibrator to produce trains of waves corresponding to each tripping of said multivibrator, and a light signal pulse producing device connected to said source of high frequency waves for producing light signaling pulses corresponding to each train of waves from said high frequency source.

2. A signaling system comprising a source of electrical signaling pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a Kerr cell light valve having electrodes and producing light pulses when a voltage is applied to said electrodes, and means controlled by said source of high frequency waves to apply voltages to said electrodes corresponding to said trains of waves from said high frequency source.

3. A signaling system comprising a source of electrical signaling pulses, means to differentiate said pulses producing peaked pulses therefrom, a single trip multivibrator connected to said differentiating means for tripping by said differentiated pulses, a source of high frequency waves controlled by said multivibrator to produce trains of waves corresponding to each tripping of said multivibrator, a supersonic light valve for producing light pulses when a voltage is applied to the electrodes of a driver element thereof, and means controlled by said source of high frequency waves to apply voltages to said electrodes corresponding to said trains of waves from said high frequency source.

4. A signaling system comprising a source of electrical signaling pulses, means to differentiate said pulses producing peaked pulses therefrom, a single trip multivibrator connected to said differentiating means for tripping by said differentiated pulses, a source of high frequency waves controlled by said multivibrator to produce trains of waves corresponding to each tripping of said multivibrator, a cathode ray tube light valve for producing light pulses when a voltage is applied to a control electrode of said cathode ray tube, a grid-controlled vacuum tube for controlling the voltage applied to said cathode ray tube, and means controlled by said source of high frequency waves to apply voltages to said grid corresponding to said trains of waves from said high frequency source to control the voltages applied to said cathode ray tube.

5. A signaling system comprising a source of electrical signaling pulses, means to differentiate said pulses producing peaked pulses therefrom, a single trip multivibrator connected to said differentiating means for tripping by said differentiated pulses, a cathode ray tube light valve for producing light pulses when a suitable voltage is applied to a pair of deflecting plates in said cathode ray tube, and means controlled by said multivibrator and including a source of high frequency waves for producing trains of waves corresponding to each tripping of said multivibrator for applying said voltage to the deflecting plates of said cathode ray tube to produce light pulses corresponding to each tripping of said multivibrator.

6. A signaling system comprising a source of electrical signaling pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a cathode ray tube light valve for producing light pulses when a suitable voltage is applied to a pair of deflecting plates in said cathode ray tube, a grid-controlled vacuum tube for controlling the voltage applied to said deflecting plates, and means controlled by said source of high frequency waves to apply voltages to said grid corresponding to said trains of waves from said high frequency source to control the voltages applied to said deflecting plates to produce light pulses.

7. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, and a light signal pulse producing device connected to said source of high frequency waves for producing light signaling pulses corresponding to each train of waves from said high frequency source.

8. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a Kerr cell light valve having electrodes and producing light pulses when a voltage is applied to said electrodes, and means controlled by said source of high frequency waves to apply voltages to said electrodes corresponding to said trains of waves from said high frequency source.

9. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a supersonic light valve for producing light pulses when a voltage is applied to the electrodes of a driver element thereof, and means controlled by said source of high frequency waves to apply voltages to said electrodes corresponding to said trains of waves from said high frequency source.

10. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a cathode ray tube light valve for producing light pulses when a voltage is applied to a control electrode of said cathode ray tube, a grid control vacuum tube for controlling the voltage applied to said cathode ray tube, and means controlled by said source of high frequency waves to apply voltages to said grid corresponding to said trains of waves from said high frequency source to control the voltages applied to said cathode ray tube.

11. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a cathode ray tube light valve for producing light pulses when a suitable voltage is applied to a pair of deflecting plates in said cathode ray tube, and means controlled by said multivibrator and including a source of high frequency waves producing trains of waves corresponding to each tripping of said multivibrator for applying said voltage to the deflecting plates of said cathode ray tube to produce light pulses corresponding to each tripping of said multivibrator.

12. A light repeater comprising a photoelectric electron multiplier for illumination by light signal pulses and for producing corresponding electrical pulses, means to differentiate said pulses producing peaked pulses therefrom, a single trip multivibrator connected to said differentiating means for tripping by said differentiated pulses, a source of high frequency waves controlled by said multivibrator for producing trains of waves corresponding to each tripping of said multivibrator, a cathode ray tube light valve for producing light pulses when a suitable voltage is applied to a pair of deflecting plates in said cathode ray tube, a grid controlled vacuum tube for controlling the voltage applied to said deflecting plates, and means controlled by said source of high frequency waves to apply voltages to said grid corresponding to said trains of waves from said high frequency source to control the voltages applied to said deflecting plates to produce light pulses.

13. A signaling system comprising a source of electrical signaling pulses of approximately square wave shape, means to differentiate said pulses to produce corresponding peaked pulses, a single trip multivibrator comprising a first triode having a cathode, an anode and a control grid, a second triode having a cathode, an anode and a control grid, a condenser connected between the anode of said first triode and the grid of said second triode, a source of direct current voltage, a cathode resistor connected between the negative terminal of said source of direct current voltage and both said cathodes of said triodes, a first anode resistor connected between the anode of said first triode and the positive terminal of said source of direct current voltage, a second anode resistor connected between the anode of said second triode and the positive terminal of said source of direct current voltage, and a resistor connected between the grid of said second triode and the positive terminal of said source of direct current voltage adapted to discharge said condenser, means to apply voltages corresponding to said peaked pulses between the grid of said first triode and the negative terminal of said source of direct current voltage, a pentode vacuum tube having a cathode, an anode, a control grid and a suppressor grid, a high frequency oscillator for impressing high frequency oscillations between the control grid and cathode of said pentode tube, a conductive connection including a high frequency choke coil connected between said suppressor grid and the anode of said second triode, and an output signaling circuit connected between the anode and cathode of said pentode wherein trains of such high frequency oscillations are produced corresponding to each pulse of square wave shape produced by said source of electrical signaling pulses.

14. An impulse producing system comprising a single trip multivibrator including a first triode having a cathode, an anode and a control grid, a second triode having a cathode, an anode and a control grid, a condenser connected between the anode of said first triode and the grid of said second triode, a source of direct-current voltage, a cathode resistor connected between the negative terminal of said source of direct-current voltage and both said cathodes of said triodes, a first anode resistor connected between the anode of said first triode and the positive terminal of said source of direct-current voltage, a second anode resistor connected between the anode of said second triode and the positive terminal of said source of direct-current voltage, a resistor connected between the grid of said second triode and the positive terminal of said source of direct-current voltage adapted to completely discharge said condenser, and a resistor connected between the grid of said first triode and the negative terminal of said source of direct-current voltage whereby said second triode is normally conducting and said first triode is blocked, a vacuum tube amplifier including a cathode, an anode and at least one grid, a conductive connection between the cathode of said amplifier and the positive terminal of said source of direct-current voltage, and a conductive connection from the said grid of said amplifier to the anode of said second triode whereby the grid of said amplifier is normally negative with respect to the cathode of said amplifier.

15. An impulse producing system like claim 14 wherein the vacuum tube amplifier is a pentode vacuum tube including a control grid and a suppressor grid, the suppressor grid being the grid conductively connected to the anode of said second triode, and a source of high frequency oscillation connected to the control grid and cathode of said amplifier whereby said amplifier is blocked driving the interval of negative voltage impressed on said suppressor grid with respect to said cathode.

LUTHER G. SCHIMPF.

REFERENCES CITED

The following references are of record in the file of this patent:

UNITED STATES PATENTS

| Number | Name | Date |
|---|---|---|
| 1,849,488 | Hanna | Mar. 15, 1932 |
| 1,976,120 | Francis | Oct. 9, 1934 |
| 2,055,883 | Terry | Sept. 29, 1936 |
| 2,140,730 | Batchelor | Dec. 20, 1938 |
| 2,224,690 | Moodey et al. | Dec. 10, 1940 |
| 2,234,329 | Wolff | Mar. 11, 1941 |
| 2,291,045 | Lancor | July 28, 1942 |
| 2,308,360 | Fair | Jan. 12, 1943 |
| 2,362,651 | Luck | Nov. 14, 1944 |
| 2,425,063 | Kahn et al. | Aug. 5, 1947 |
| 2,425,315 | Atwood | Aug. 12, 1947 |
| 2,425,316 | Dow | Aug. 12, 1947 |
| 2,425,600 | Coykendall | Aug. 12, 1947 |
| 2,428,058 | Wise | Sept. 30, 1947 |
| 2,432,188 | Bliss | Dec. 9, 1947 |
| 2,455,617 | Shepard, Jr. | Dec. 7, 1948 |
| 2,477,485 | Jacob | July 26, 1949 |

FOREIGN PATENTS

| Number | Country | Date |
|---|---|---|
| 903,717 | France | Jan. 29, 1945 |